United States Patent
Kini et al.

(10) Patent No.: US 8,730,956 B2
(45) Date of Patent: *May 20, 2014

(54) PAY-AS-YOU-GROW GRADUAL CUTOVER METHOD TO SCALE A PROVIDER BRIDGE NETWORK TO A VPLS OR PROVIDER BACKBONE BRIDGING NETWORK

(75) Inventors: Sriganesh Kini, Fremont, CA (US); Attila Zoltan Takacs, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 483 days.

This patent is subject to a terminal disclaimer.

(21) Appl. No.: 13/164,760

(22) Filed: Jun. 20, 2011

(65) Prior Publication Data
US 2011/0249677 A1    Oct. 13, 2011

Related U.S. Application Data

(63) Continuation of application No. 12/463,365, filed on May 8, 2009, now Pat. No. 7,965,711.

(51) Int. Cl.
*H04L 12/28* (2006.01)

(52) U.S. Cl.
USPC ... 370/389; 370/395.54; 370/256; 370/395.5; 370/395.53; 370/401

(58) Field of Classification Search
CPC combination set(s) only.
See application file for complete search history.

(56) References Cited

U.S. PATENT DOCUMENTS

| | | | |
|---|---|---|---|
| 7,072,337 B1 | 7/2006 | Arutyunov et al. | |
| 7,660,303 B2 | 2/2010 | Solomon et al. | |
| 7,693,144 B2 | 4/2010 | de Heer | |
| 7,948,993 B2 | 5/2011 | Kini et al. | |
| 7,965,711 B2 | 6/2011 | Kini et al. | |
| 8,059,549 B2 | 11/2011 | Soon et al. | |
| 2009/0201937 A1 | 8/2009 | Bragg et al. | |
| 2010/0208593 A1 | 8/2010 | Soon et al. | |
| 2010/0208615 A1 | 8/2010 | Soon et al. | |
| 2010/0271980 A1 | 10/2010 | Kini et al. | |

OTHER PUBLICATIONS

Notice of Allowance, U.S. Appl. No. 12/463,365, dated Feb. 2, 2011, 8 pages.
Notice of Allowance, U.S. Appl. No. 12/463,364, dated Jan. 14, 2011, 8 pages.
Non-Final Office Action, U.S. Appl. No. 13/087,279, dated Nov. 13, 2012, 10 pages.
Notice of Allowance, U.S. Appl. No. 13/087,279, dated Apr. 25, 2013, 12 pages.
"Media Access Control (MAC) Bridges", Jun. 9, 2004, 281 pages, IEEE, New York, USA.

(Continued)

*Primary Examiner* — Hassan Phillips
*Assistant Examiner* — Hicham Foud
(74) *Attorney, Agent, or Firm* — Blakely Sokoloff Taylor & Zafman LLP (57) ABSTRACT

A method and apparatus that operates two bridging protocols in a hybrid bridging node is described. The operation of the two bridging protocols in the hybrid node allows for an incremental transition of a provider bridging network from operating a legacy bridging protocol that shares MAC addresses to a bridging network that operates VPLS and/or PBB bridging protocols. The hybrid bridging node selectively broadcasts unicast packets with unknown MAC addresses from the nodes operating VPLS and/or PBB to nodes operating a legacy bridging protocol.

20 Claims, 8 Drawing Sheets

(56) References Cited

OTHER PUBLICATIONS

"Media Access Control (MAC) Bridges and Virtual Bridged Local Area Networks", 2012, 1782 pages, IEEE Std 802.1Q, New York, USA.
"Virtual Bridged Local Area Networks Amendment 4: Provider Bridges", 2005, 74 pages, IEEE Computer Society, IEEE Std 802.1ad, New York, USA.
"Virtual Bridged Local Area Networks Amendment 7: Provider Backbone Bridges", Aug. 14, 2008, 121 pages, IEEE Computer Society, IEEE Std 802.1ah, New York, USA.
Kompella, K., et al., "Virtual Private LAN Service (VPLS) Using BGP for Auto-Discovery and Signaling", Jan. 2007, 29 pages, RFC 4761.
Lasserre, M., et al., "Virtual Private LAN Service (VPLS) Using Label Distribution Protocol (LDP) Signaling", Jan. 2007, 32 pages, RFC 4762.

PAY-AS-YOU-GROW GRADUAL CUTOVER METHOD TO SCALE A PROVIDER BRIDGE NETWORK TO A VPLS OR PROVIDER BACKBONE BRIDGING NETWORK

CROSS-REFERENCE TO RELATED APPLICATIONS

This application is a continuation of application Ser. No. 12/463,365, filed May 8, 2009, now issued as U.S. Pat. No. 7,965,711, which is hereby incorporated by reference.

BACKGROUND

1. Field

Embodiments of the invention relate to the field of bridge network; and more specifically, to the transitioning a bridging network from a 802.1ad bridging network to a Virtual Private Local Area Network Service (VPLS) bridging network or a 802.1ah Provider Backbone Bridging (PBB) bridging network.

2. Background

A provider bridging network provides bridging access for customers to network services, such as Internet access, voice services, digital television, etc. One method of provider bridging is performed by a provider bridging network that communicates packets with customer end stations using a bridging protocol such as IEEE 802.1D, IEEE 802.1ad and/or IEEE 802.1Q Virtual Local Area Network (VLAN) tagging. A provider bridging network is composed of provider bridging edge nodes that communicate packets with customer edge bridging nodes and provider core bridging nodes that communicate packets between provider edge bridging nodes. Bridging nodes using these protocols share Media Access Control (MAC) addresses with all other bridging nodes in the provider network by broadcasting address resolution packets and unicast packets with unknown destination addresses.

However, the problem with this approach is that because these protocols share MAC address spaces with all other bridging nodes, each of the bridges can have MAC address table that become very large. As more end stations are added to the network, the tables for each of the bridges grow and can meet the maximum MAC address table size of these bridges. For example, a network can be composed several to tens of thousands (or more) end stations, which can lead to very large MAC address tables.

Alternatively, a provider bridging network can communicate packets using VPLS (Request for Comment (RFC) 4761 and 4762) and/or PBB (IEEE 802.1ah). These protocols provide bridging services by establishing point to point bridging connections within the provider's bridging network. However, to use VPLS and/or PBB, the entire network needs to be upgraded at once, which can be expensive in terms of capital and operating expenditures.

BRIEF SUMMARY

A method and apparatus that operates two bridging protocols in a hybrid bridging node is described. The operation of the two bridging protocols in the hybrid node allows for an incremental transition of a provider bridging network from operating a legacy bridging protocol that shares MAC addresses to a bridging network that operates VPLS and/or PBB bridging protocols. Legacy nodes that operate the legacy bridging protocol stored shared end station MAC address in a MAC address table.

In one embodiment, the method operates the legacy bridging protocol on a first port of the hybrid node, where the first port is coupled to a first node operating the legacy bridging protocol and not an upgraded bridging protocol (e.g., VPLS and/or PBB). Furthermore, the method operates the upgraded bridging protocol on a plurality of other ports of the hybrid node. The method receives first unicast packets from the first port and second unicast packets on the plurality of other ports, where these unicast packets contain destination MAC addresses that are unknown to the hybrid node.

The method limits with the hybrid node the number of MAC addresses that the first node stores in its MAC address table by broadcasting the first unicast packets out the plurality of other ports and broadcasting the second unicast packets out those of the plurality of other ports on which they were not received. In addition, the method broadcasts the third unicast packets out the first port, where each of the third unicast packets has the same destination MAC address as one of the second unicast packets. Furthermore, each of the third unicast packets was received at a time by which its destination MAC address would have been learned responsive to said step of broadcasting the second unicast packets if the corresponding destination end station were coupled to one of the plurality of other ports.

In another embodiment, a network comprises a legacy bridging sub-network, an upgraded bridging sub-network, and a hybrid node coupled to the two bridging sub-networks. Nodes in the legacy bridging sub-network communicate packets within the legacy bridging sub-network according to a legacy bridging protocol and not an upgraded bridging protocol. The legacy bridging protocol shares MAC addresses of the end stations amongst all nodes and end stations directly coupled to each other with the legacy bridging protocol. In addition, each of the nodes operating the legacy bridging protocol stores the shared end station MAC addresses in a MAC address table. Nodes in the upgraded bridging sub-network communicate packets within the second bridging sub-network according to the upgraded bridging network.

The hybrid node operates the legacy and upgraded bridging protocols and is composed of a first port, a plurality of other ports, a legacy bridge instance, an upgraded bridge instance, and a MAC relay component. The first port is coupled to a first node in the legacy bridging sub-network and the plurality of other ports are coupled to a plurality of other nodes in the upgraded bridging sub-network. The legacy bridge instance, coupled to the first port, operates the legacy bridging protocol and the upgraded bridge instance, coupled to the plurality of other ports, operates the upgraded bridging protocol.

The MAC relay component relays first unicast packets received on the first port to the second bridge instance, which broadcasts them out the plurality of other ports. The first unicast packets contain destination MAC addresses that are unknown to the hybrid node. In addition, the MAC component inhibits relays to the legacy bridge instance second unicast packets received on the plurality of other ports. The second unicast packets contain destination MAC addresses that are unknown to the hybrid node and each of the second unicast packets are broadcast out the plurality of other ports that did not received that second unicast packet. Furthermore, the MAC component relays to the legacy bridge instance third unicast packets received on the plurality of other ports. The third unicast packets contain destination MAC addresses that are unknown to the hybrid node and each of the third unicast packets has the same destination MAC address as one of the second unicast packets. In addition, each of the third unicast packets was received at a time by which its destination MAC address would have been learned responsive to the broadcast of the second unicast packets if the corresponding destination end station were coupled to one of the plurality of other ports.

In another embodiment, a network element operates the legacy and upgrade bridging protocols. The network element is adapted to allow for an incremental transition of nodes in said network from the legacy bridging protocol to the upgraded bridging protocol. The legacy bridging protocol shares MAC addresses of end stations amongst all nodes and end stations directly coupled to each other with the legacy bridging protocol. Nodes operating the legacy bridging protocol store the shared end station MAC addresses in a MAC address table.

The network element is composed of a first port, a plurality of other ports, a legacy bridge instance, an upgraded bridge instance, and a MAC relay component. The first port is to receive first unicast packets from the first node and the plurality of other nodes is to receive second and third unicast packets from a plurality of other nodes. The first, second, and third unicast packets contain destination MAC addresses that are unknown to the network element. The legacy bridge instance is to operate the legacy bridging protocol, and to broadcast out the first port any of the third unicast packets that are relayed to the legacy bridging instance. The upgraded bridge instance is operate the upgraded bridging protocol, to broadcast out the plurality of other ports any of the first unicast packets that are relayed to the upgraded bridging instance, and to broadcast the second unicast packets out those of the plurality of other ports on which they were not received.

The MAC relay component is to relay the first unicast packets to the upgraded bridge instance, relay the third unicast packets to the legacy bridge instance, and inhibit relay to the legacy bridge instance the second unicast packets. In addition, each of the third unicast packets was received at a time by which its destination MAC address would have been learned responsive to the broadcast of the second unicast packets if the corresponding destination end station were coupled to one of the plurality of other ports.

It is an object to obviate at least some of the above disadvantages and provide an improved bridging node for networking.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details such as network element, LAN, VPLS, PBB, sub-network, bridging, provider bridging, packet, MAC, address resolution protocol, broadcasting, means to specify operands, resource and network partitioning/sharing implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIGS. 2-8. However, it should be understood that the operations of flow diagrams can be performed by embodiments of the invention other than those discussed with reference to FIGS. 3-4 and 6-7, and the embodiments discussed with reference to FIGS. 2 and 8 can perform operations different than those discussed with reference to the flow diagrams.

The techniques shown in the figures can be implemented using code and data stored and executed on one or more electronic devices (e.g., a computer end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more buses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

A method and apparatus of operating two bridging protocols in a hybrid bridging node is described. The operation of the two bridging protocols in the hybrid node allows for an incremental transition of a provider bridging network that operates a bridging protocol that shares MAC addresses to a bridging network that operates VPLS and/or PBB bridging protocols.

According to one embodiment of the invention, the hybrid bridging node couples a legacy sub-network with an upgraded sub-network hybrid bridging node of the provider bridging network. Nodes in the legacy sub-network operate a bridging protocol that shares MAC addresses with all other nodes such as 802.1D, 802.1Q VLAN tagging, and/or 802.1ad provider bridging protocol and not VPLS or PBB. Nodes in the upgraded sub-network operate VPLS and/or PBB. The hybrid bridging node operates a legacy bridging protocol on ports coupled to nodes of a legacy sub-network in order to communicates packets with those nodes with that protocol. In addition, the hybrid bridging node operates VPLS and/or PBB protocols on ports that are coupled with nodes of the upgraded sub-network. The hybrid bridging node extends the life of nodes in the legacy sub-network by selectively broadcasting unicast packets from the upgraded sub-network to the legacy sub-network. Selectively broadcasting these unicast packets from the upgraded sub-network to the legacy sub-network limits the number of MAC addresses that nodes in the legacy sub-network have to learn, which limits the number of the MAC addresses stored in MAC address tables for these nodes.

As used herein, a network element (e.g., a router, switch, bridge, etc.) is a piece of networking equipment, including hardware and software that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computer end stations belonging to a service or content provider, and may include public webpages (free content, store fronts, search services, etc.), private webpages (e.g., username/password accessed webpages providing email services, etc.), access to content (video, audio, etc.), corporate networks over VPNs, other services (telephone, etc.), etc. Typically, subscriber computer end stations are coupled (e.g., through customer premise equipment coupled to an access network (wired or wirelessly)) to edge network elements, which are coupled (e.g., through one or more core network elements to other edge network elements) to the server computer end stations.

Some network elements support the configuration of multiple contexts. As used herein, each context includes one or more instances of a virtual network element (e.g., a virtual router, a virtual bridge). Each context typically shares system resources (e.g., memory, processing cycles, etc.) with other contexts configured on the network element, yet is independently administrable. For example, in the case of multiple virtual routers, each of the virtual routers may share system resources but is separate from the other virtual routers regarding its management domain, AAA name space, IP address, and routing database(s). Multiple contexts may be employed in an edge network element to provide direct network access and/or different classes of services for subscribers of service and/or content providers.

Within certain network elements, multiple "interfaces" may be configured. As used herein, each interface is a logical entity, typically configured as part of a context, which provides higher-layer protocol and service information (e.g., Layer 3 addressing) and is independent of physical ports and circuits (e.g., ATM PVC (permanent virtual circuits), 802.1Q VLAN, PVC, QinQ circuits, DLCI circuits, etc.). AAA (authentication, authorization, and accounting) may be provided for through an internal or external server, such as a RADIUS (Remote Authentication Dial-In User Service) or DIAMETER server. The AAA server provides subscriber records for subscribers that identify, among other subscriber configuration requirements, to which context (e.g., which of the virtual routers) the corresponding subscribers should be bound within the network element. As used herein, a binding forms an association between a physical entity (e.g., port, channel, etc.) or a logical entity (e.g., circuit (e.g., subscriber circuit (a logical construct that uniquely identifies a subscriber session within a particular network element that typically exists for the lifetime of the session), logical circuit (a set of one or more subscriber circuits), etc.), etc.) and a context's interface over which network protocols (e.g., routing protocols, bridging protocols) are configured for that context. Subscriber data flows on the physical entity when some higher-layer protocol interface is configured and associated with that physical entity. By way of a summary example, subscriber computer end stations may be coupled (e.g., through an access network) through a multiple services edge network element (supporting multiple contexts (e.g., multiple virtual routers), interfaces, and AAA processing) coupled to core network elements coupled to server computer stations of service/content providers. Further, AAA processing is performed to identify the subscriber record for a subscriber which identifies one or more contexts in the network element to which that subscriber's traffic should be bound, and includes a set of attributes (e.g., subscriber name, password, authentication information, access control information, rate-limiting information, policing information, etc.) used during processing of that subscriber's traffic.

Figure 1:
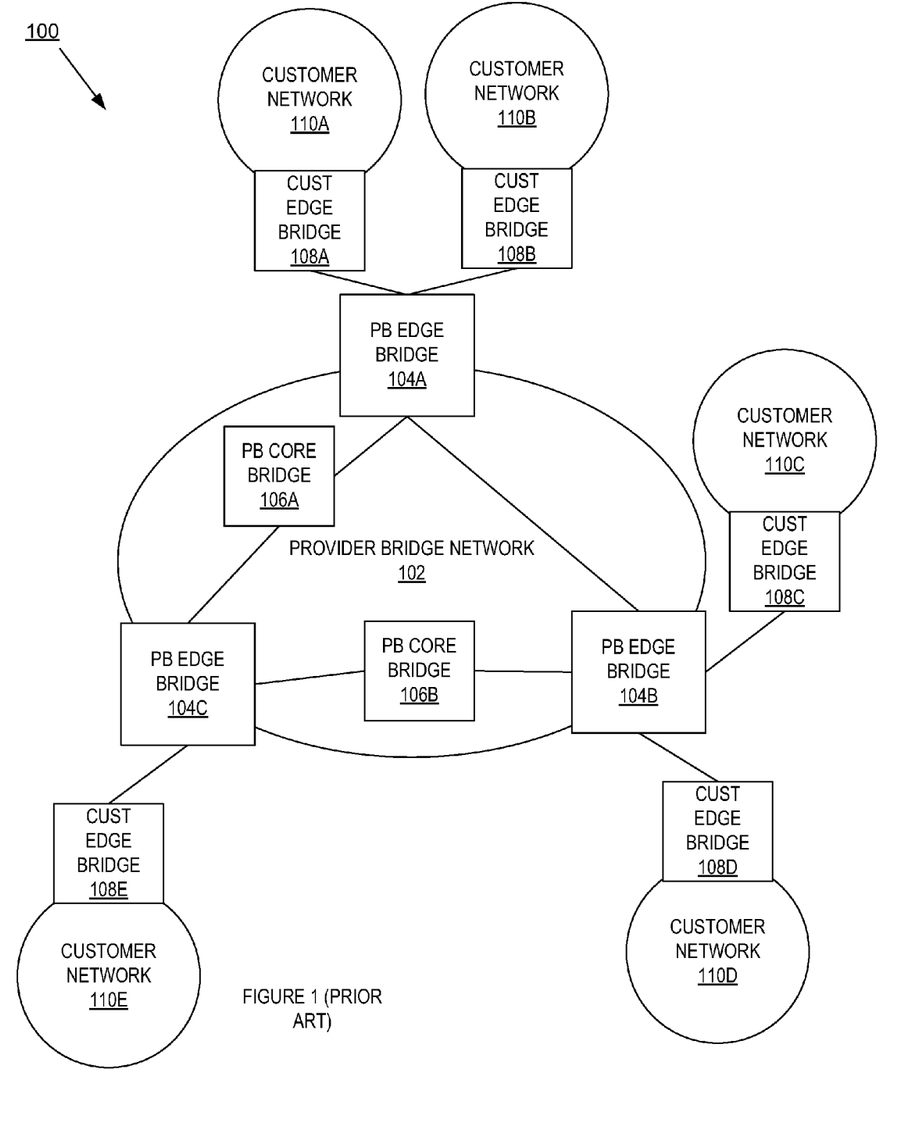
FIG. 1 (prior art) illustrates a provider bridging network.

FIG. 1 (prior art) illustrates a provider bridging network. In FIG. 1, network 100 is composed of provider bridge (PB) network 102 that couples with customer networks 110A-E. PB network 102 is a network that provides separate instances of bridging service to multiple independent customers in the different customer networks 110A-E. PB network 102 is composed of PB edge bridges 104A-C and PB core bridges 106A-B. PB network 102 and customer networks 110A-E are coupled via PB edge bridges 104A-C and customer edge bridges 108A-E. For example, PB edge bridge 104A couples to customer edge bridge 108A-B to access customer networks 110A-B, respectively. PB edge bridge 104B couples to customer edge bridge 108C-D to access customer networks 110C-D, respectively. PB edge bridge 104C couples to customer edge bridge 108E to access customer networks 110E, respectively. Provider bridge edge bridges 108A-C switch packets with customer edge bridges 108A-E using bridge protocols, such as 802.1D bridging, 802.1ad provider bridging, and 802.1Q/VLAN protocols. PB core bridges 106A-B switch packets between PB core bridges 104A-C using these bridging protocols. As is known in the art, bridges using these protocols maintain MAC address forwarding tables. Each of the PB bridges can build these tables using by receiving address resolution packets and unknown MAC addresses. Furthermore, PB bridges build these tables by examination of source MAC addresses in received packets.

The problem with this approach is that because the building of the bridge tables relies on packets broadcast, each of the PB bridges 104A-C and 106A-B see all of the addresses of the end stations coupled to customer networks 110A-E. As more end stations are added to each of the customer network 110A-E, the tables for each of the PB bridges 104A-C and 106A-B grow and can meet the maximum MAC address table size of these bridges. For example, each of customer networks 110A-E can be composed several to tens of thousands (or more) end stations, which can lead to very large MAC address tables.

To overcome these problems, a provider can upgrade each of the PB bridges 104A-C and 106A-B to have larger MAC address tables or the provider can change every bridge in PB network 102 to support VPLS and/or PBB. However, both of these potential upgrades can be expensive in terms of capital and operating expenditures. For example, customer networks 110D-E maybe the ones that have large numbers of end stations, which could lead upgrades for all of PB bridges 104A-C and 106A-B, instead just upgrading PB bridges 104B-C and 106B.

In order to avoid the expensive cost of a wholesale upgrade of the provider bridge network, it would be useful to be able to transition, in stages the PB network from 801.ad, 802.1D, and/or VLAN bridging protocols to a PB network that supports VPLS and/or PBB. To allow this transition, the PB network would need to support a hybrid bridging PB network that includes a mixture of legacy bridging nodes operating one of 801.ad, 802.1D, and/or VLAN bridging protocols and upgraded bridging nodes running VPLS and/or PBB.

For example and in one embodiment, the PB network can be upgraded in a step-by-step fashion. In this embodiment, the PB network upgrade can be accomplished in a simple and cost efficient way. The PB network upgrade can start small and grow gradually with preferably gradually increasing benefits. Thus, PBB and/or VPLS can be introduced step-by-step: upgrading heavily loaded bridges and/or bridges interfaces and leaving the least critical network parts for later upgrades.

Figure 2:
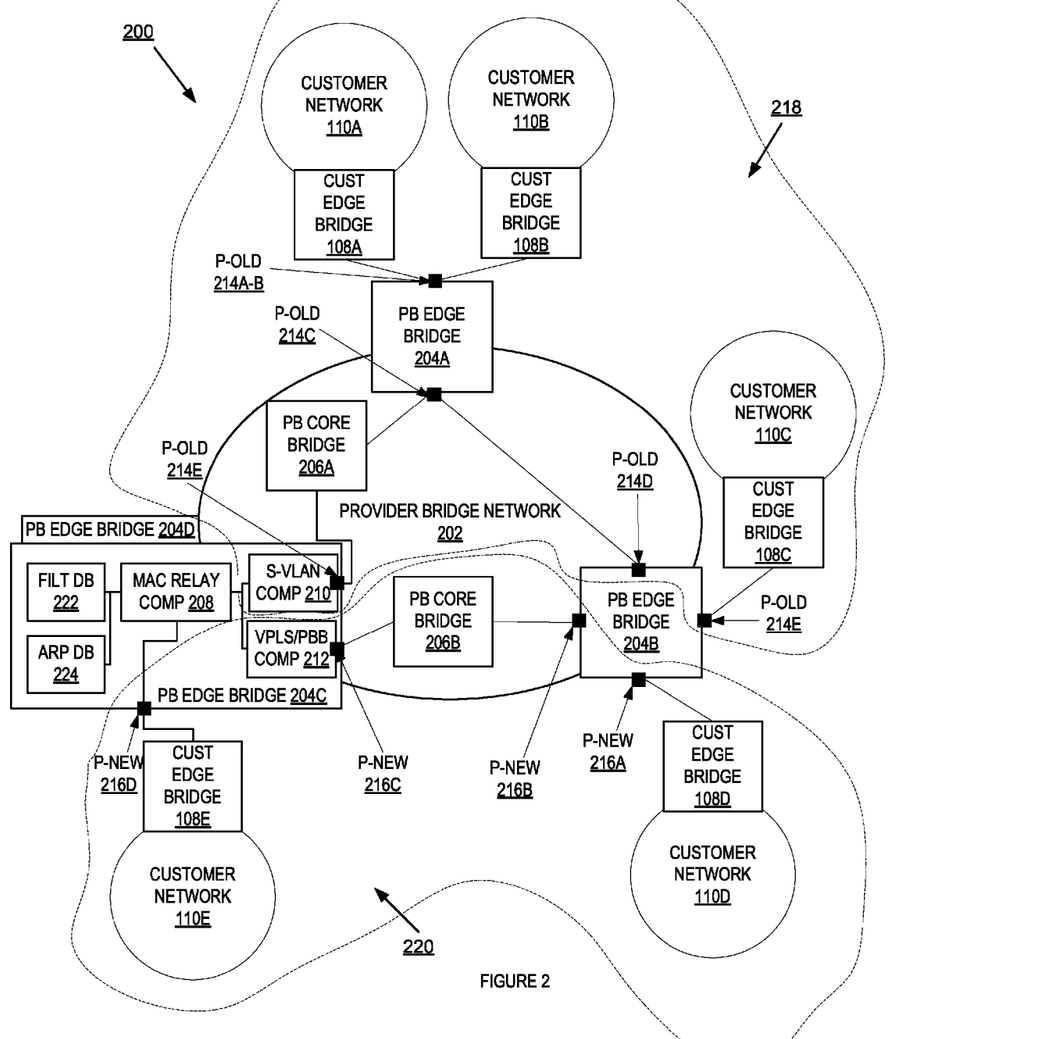
FIG. 2 illustrates a hybrid provider bridging network that allows for the transition of the provider network from bridging protocols used in FIG. 1 to VPLS and/or PBB bridging services according to one embodiment of the invention.

FIG. 2 illustrates a hybrid PB network 202 that allows for the transition of the provider network from bridging protocols used in FIG. 1 to VPLS and/or PBB according to one embodiment of the invention. As illustrated in FIG. 2, PB network 202 is divided into two different sub-networks, a legacy bridging sub-network 218 and an upgraded sub-network 220. In one embodiment, nodes in the legacy bridging sub-network 218 operate using a legacy bridging protocol whereas nodes operating in the upgraded sub-network 220 operate one of the upgraded bridging protocols. In one embodiment, legacy sub-network 218 is composed of legacy bridging nodes that communicate packets using one of the legacy bridging protocols. In one embodiment, a legacy bridging protocol is a bridging protocol that shares MAC address information with other bridging nodes in the PB network 202. For example and in one embodiment, a legacy bridging protocol is 802.1ad bridging, 802.1D bridging, 802.1Q VLAN, etc. Furthermore, legacy bridging nodes do not operate one of the upgraded bridging protocols described below.

In FIG. 2, legacy sub-network 218 is composed of customer networks 110A-C, customer edge bridges 108A-C, PB edge bridge 204A, and PB core bridge 206A. Customer networks 110A-C couple to legacy sub-network 218 via customer edge bridges 108A-C that couple to the respective customer networks and PB edge bridge 204A-B. For example, customer edge network 110A is coupled to customer edge bridge 108A which is coupled to PB edge bridge 204A. Customer edge network 110B is coupled to customer edge bridge 108B which is coupled to PB edge bridge 204A. Customer edge network 110C is coupled to customer edge bridge 108A which is coupled to PB edge bridge 204B.

In one embodiment, PB edge bridge 204A is a legacy bridging node that communicates packets with other nodes and/or end stations using a legacy bridging protocol. In the embodiment, PB edge bridge is composed of P-old ports 214A-C. As used herein, a P-old port is a port that connects (or directly couples) devices operating in the legacy sub-network 218. For example and in one embodiment, P-old port 214A-B connects PB edge bridge 204A to customer edge bridges 108A-B, respectively. As described above, PB edge bridge 204A communicate packets with customer edge bridges 108A-B using a legacy bridging protocol. As another example, P-old port 214C connects PB edge bridge with PB core bridge 206A. Because PB edge bridge 204A and PB core bridge 206A are part of legacy sub-network 218, PB edge bridge 204A and PB core bridge 206A communicate packets using a legacy bridging protocol.

Upgraded sub-network 220 is composed of upgraded bridging nodes that communicate packets using one of the upgraded bridging protocols. In one embodiment, an upgraded bridging protocol is a bridging protocol that does not necessarily share MAC address information with other nodes in the PB network. For example and in one embodiment, an upgraded bridging protocol is VPLS, PBB, multi-protocol label switching, generic routing encapsulation tunnels, etc. For example and in one embodiment, VPLS is a virtual private network technology that does not necessarily share MAC address information with all other bridging nodes not operating VPLS. As another example and in another embodiment, bridging nodes operating PBB do not share MAC address as a PBB bridging edge node aggregates customer traffic and sends it to another PBB bridging node.

In FIG. 2, upgraded sub-network 220 is composed of customer networks 110D-E, customer edge bridges 108D-E, and PB core bridges 206B-C. Furthermore, PB edge bridge 204B couples customer edge bridge 108C and 108D to legacy sub-network 218 and upgraded sub-network 220, respectively. PB edge bridges 204C-D couple customer edge bridge 108E to legacy sub-network 218 and upgraded sub-network 220, respectively. In one embodiment, PB edge bridges 204B-D are examples of a hybrid bridging node that couple legacy sub-network 218 and upgraded sub-network 220. Hybrid bridging nodes are described further below. In addition, PB core bridge 206B couples PB edge bridge 204B and PB edge bridges 204C-D.

As mention above, coupling the two sub-networks is a hybrid bridging node. In one embodiment, the hybrid bridging node can operate both a legacy and an upgraded bridging protocol. In this embodiment, the hybrid bridging node includes P-old and P-new ports. As described above, a P-old port is a port that connects (or directly couples) devices operating in the legacy sub-network 218. In contrast, a P-new port is a port that connects to devices operating in the upgraded sub-network 220. This hybrid bridging node extends the life of legacy bridging nodes by restricting discovery of legacy bridging nodes of end stations address in the upgraded sub-network. By restricting this end station address discovery, the MAC address tables of the legacy bridging nodes do not grow as large as in FIG. 1. Thus, the hybrid bridging node limits the number of MAC addresses that nodes in the legacy sub-network stores in these nodes' MAC address tables. In one embodiment, P-new ports can couple to nodes in the providers and/or customer networks.

In one embodiment, legacy bridging nodes broadcast all address request, address announcement, and unicast packets with unknown destination addresses. In one embodiment, address request and address announcement packets are ARP gratuitous and non-gratuitous request packets, respectively. As used hereinafter, an ARP request packet is a non-gratuitous ARP request packet and an ARP announcement packet is a gratuitous ARP request packet.

In one embodiment, the hybrid node selectively broadcasts certain unicast packets between legacy sub-network 218 and upgraded sub-network 220. In particular, the hybrid bridging node may broadcast unicast packets with unknown destination MAC addresses received on a P-new port out other P-new ports, but not out P-old ports. In one embodiment, the hybrid node broadcasts out the P-old ports unicast packets with unknown destination MAC address received on the P-old ports (except for the port that received that unicast packet). In another embodiment, the hybrid node selectively broadcasts unicast packets with unknown destination MAC address out P-new ports and/or P-old ports. Unicast packets processing is further described in FIGS. 3 and 4-6 below.

In another embodiment, the hybrid bridging node broadcasts out the P-new ports unicast packets with known destination MAC addresses that have expired. In one embodiment, the known destination MAC address expires due to an ageing timer expiring or this MAC address was learnt on a port that had its status changed from non-blocking to blocking. In one embodiment, an expired MAC addresses is marked with a pending delete flag in filtering database 222. This embodiment is discussed further below.

In one embodiment, a hybrid bridging node, such as PB edge bridge 204C is composed of a MAC relay component 208, two bridge instances (S-VLAN component 210 and VPLS/PBB component 212), ARP database 224, and filtering database 222. MAC relay component 208 selectively relays packets between the two bridging instances. S-VLAN component 210 is coupled to P-old port 214F and communicates packets with nodes and end stations in legacy sub-network 218. In one embodiment, S-VLAN component 210 operates one or more of the legacy bridging protocols. VPLS/PBB component 212 is coupled to P-new ports 216C-D and communicates packets with nodes and end stations in upgraded sub-network 220. In one embodiment, VPLS/PBB component 212 operates one or more of the upgraded bridging protocols.

To support the partitioning of a hybrid bridge node with the P-old and P-new ports, a database is added to each hybrid bridging node, the ARP request database 224. The ARP request database is a database that is used to track ARP requests received on P-new ports and to determine whether to broadcast an ARP request out the P-new ports, P-old ports, or both the P-new and P-old ports. In one embodiment, the ARP request database is for IP addresses whose MAC address that are not known to a particular host (e.g. as indicated in an ARP request).

In one embodiment, each entry in the filtering database 222 is composed of MAC address, ageing timer, etc. as is known in the art. Furthermore, each entry in the filtering database 222 is augmented to include additional fields for a pending-delete flag and two timers: T-restrict-unknown-bcast and T-long-age. In one embodiment, T-restrict-unknown-bcast timer is 500 milliseconds and T-long-age is 2 hours. In one embodiment, the pending delete flag represents whether a known MAC has expired due to an ageing timer expiration or port blocking status change. In one embodiment, these new fields are added for dynamically learnt entries in filtering database 222.

In one embodiment, when an entry in the filtering database 222 is newly created, the flag pending-delete for that entry is set to false. The timers T-restrict-unknown-bcast and T-long age are not started. In one entry, when a new entry has to be added to the filtering database 222 but the maximum size of that database has been accessed, then an entry that was marked pending-delete as true, least recently, is deleted and the new entry is added. In one embodiment, during the learning process of the 802.1D-2004 standard (section 7.8), if an entry is found in the filtering database 222 with the flag pending-delete as true, then the flag is marked as false and all timers associated with that entry is cancelled. The procedure described in the 802.1D-2004 standard (section 7.8) continues.

When the ageing timer of an entry in the filtering database 222 expires, the entry is not deleted but the corresponding flag pending-delete is set to true and the timer T-long-age is started. When the timer T-long-age expires, the corresponding entry is deleted. The operation of these timers and handling of unknown MAC unicast packets is further described in FIGS. 5-7 below.

Figure 3:
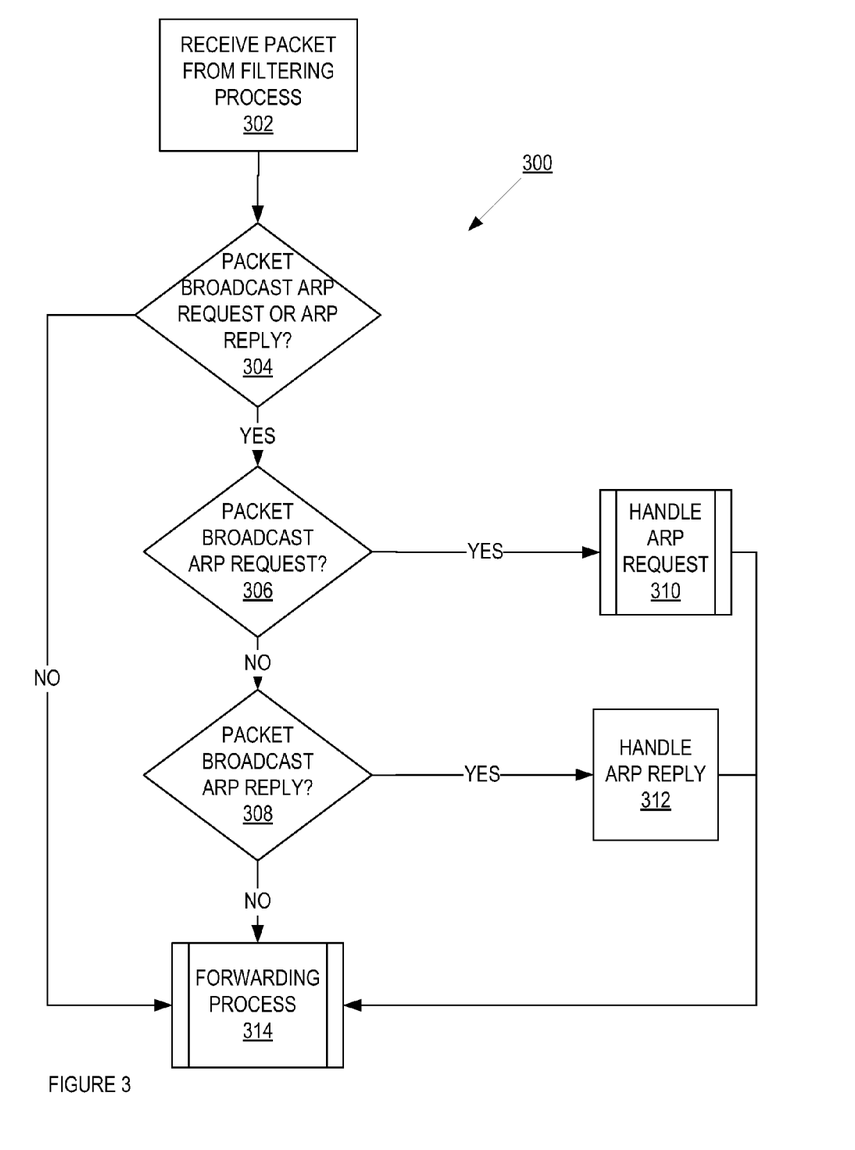
FIG. 3 is an exemplary flow diagram for forwarding received packets according to one embodiment of the invention.

FIG. 3 is an exemplary flow diagram of a method 300 for forwarding received packets according to one embodiment of the invention. In one embodiment, MAC relay component 208 of PB edge bridge 204C executes method 300 to process received packets. In FIG. 3, at block 302, method 300 receives a packet from a filtering process 302. In one embodiment, filtering process 302 is an 802.1ad filtering process as known in the art. At block 304, method 300 determines if the received packet was a packet broadcast ARP request packet or an ARP reply packet. If the received packet is not a packet broadcast ARP request or an ARP reply, method 300 forwards the packet at block 314. The forwarding process of block 314 is further described in FIG. 9, below.

If method 300 determines the received packet was a packet broadcast ARP request or ARP reply, method 300 determines if the packet broadcast is an ARP request at block 306. If the packet is an ARP request, method 300 handles the ARP request at block 310. In one embodiment, method 300 tracks unanswered ARP requests using the ARP request database. In another embodiment, method 300 broadcasts ARP announcement packets out the P-new ports. If the packet broadcast is not an ARP request, method 300 determines if the received packet broadcast is an ARP reply at block 308. If the packet broadcast is not an ARP reply, method 300 forwards the packet at block 314. The forwarding process of block 314 is further described in FIG. 4, below.

If the received packet is an ARP reply, method handles the ARP reply at block 312. At block 312, method 300 deletes an entry in the ARP request database that has the same destination MAC address and the source IP address of the node included in the ARP reply. In one embodiment, method 300 matches the destination MAC address and source IP address in the ARP reply with one of the entries in the ARP request database. By matching the characteristics of the ARP reply with entries in the ARP request database and deleting corresponding entries, method 300 can determine which of the received ARP requests have been answered and which are unanswered. In one embodiment, if that entry is found, method 300 deletes that entry and cancels any running timers associated with that entry, freeing the memory for this entry. Execution proceeds to block 314.

Figure 4:
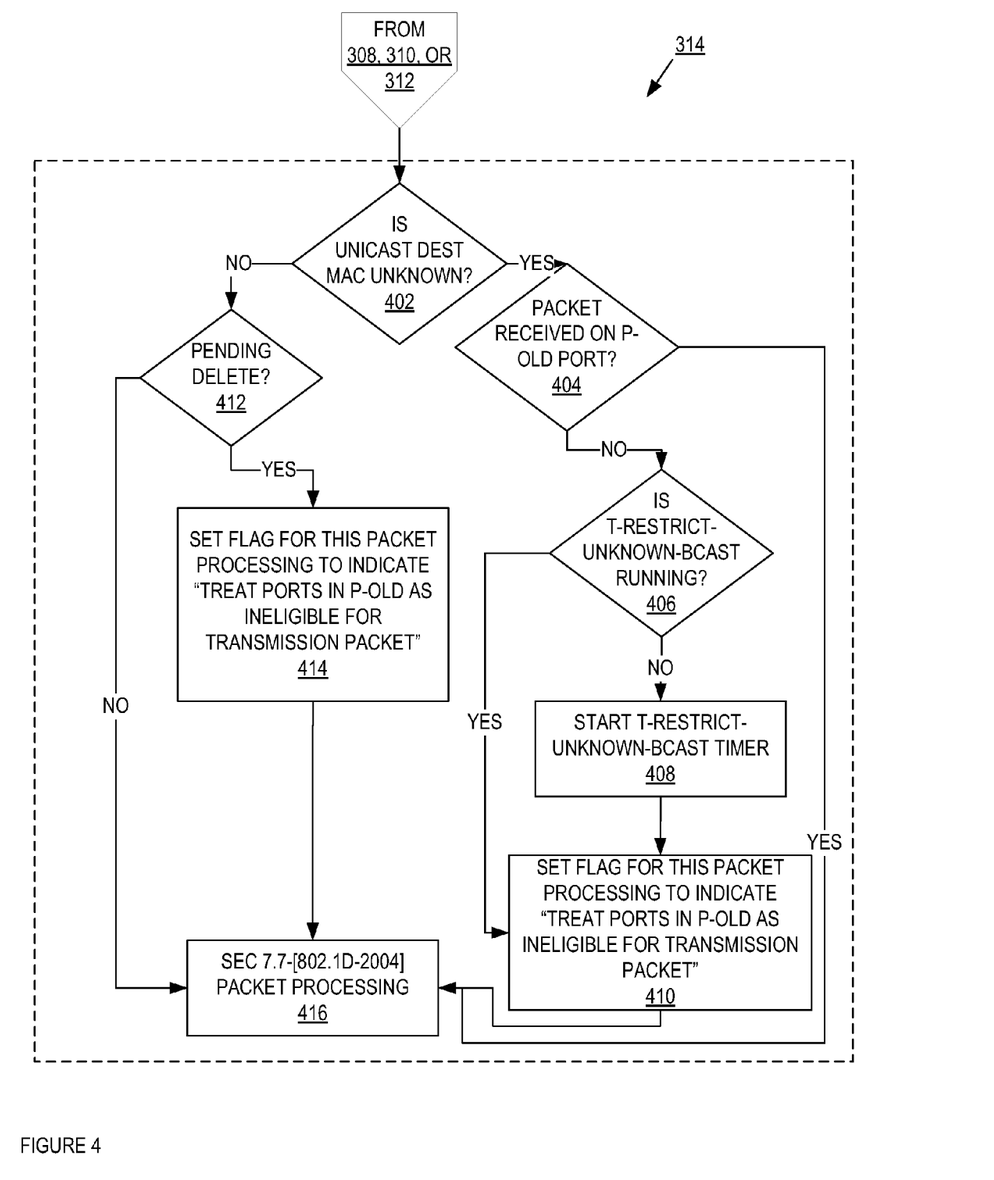
FIG. 4 is an exemplary flow diagram for the forwarding process according to one embodiment of the invention.

FIG. 4 is an exemplary flow diagram of method 300 for the forwarding process according to one embodiment of the invention. In particular, FIG. 4 represents a further description of block 314. In one embodiment, FIG. 4 modifies the unknown MAC flooding behavior of section 17.11 of the 802.1D bridging standard. In one embodiment, under an unmodified section 17.11 of the 802.1D bridging standard, a packet with unknown MAC is broadcast out all ports. In one embodiment, when an active topology change is detected that changes the status of a P-new port from non-blocking to blocking, instead of deleting entries for the MAC addresses that were learnt on that P-new port as in the 802.1D standard (section 17.11), method 300 marks the pending delete flag for those MAC addresses and starts the timer T-long-age is started.

At block 402, method 300 determines if the destination address of the received unicast packet is unknown. In one embodiment, this occurs if the port that the MAC was previous learnt on had its status change from non-blocking to blocking. In one embodiment, this change of status can occur as a result of using a protocol to detect active topology changes in the network. For example and in one embodiment, an active topology change is detected using the spanning tree protocol (e.g., as defined in the 802.1D standard) or one of the variants known in the art. If the destination MAC address of unicast is unknown, method 300 determines if this packet was received on a P-old port at block 404. If the packet was received on a P-old port, method 300 processes this packet using 802.1D packet processing as described in section 7.7 of that standard.

If the packet was not received on a P-old port (e.g., received on a P-new port), method 300 determines if the timer T-restrict-unknown-bcast is running for this packet at block 406. If this timer is running, execution proceeds to block 410. If this timer is not running, method 300 starts this timer (T-restrict-unknown-bcast) for this packet at block 408. In one embodiment, method 300 starts this timer in the entry of the filtering database corresponding to the received packet. Execution proceeds to block 410.

At block 410, method 300 sets a flag for this packet that indicates that the P-old ports are ineligible for transmission of this packet. In one embodiment, method 300 will broadcast this packet out the P-new ports and not the P-old ports. Execution proceeds to block 416, where method 300 processes packets using 802.1D packet processing as described in section 7.7 of that standard using the available ports (e.g., P-new).

If the unicast destination MAC address of the received packet is known, method 300 determines if the pending delete flag is set for this packet at block 412. In one embodiment, the pending delete flag is used to mark entries in the filtering database that could be deleted if the filtering database becomes full. In another embodiment, the pending delete flag is used to mark entries for MAC addresses that have expired due to an ageing timer expiring or because an entry corresponds to MAC address that was learnt on a port with a status change to blocking due to an active topology change (see, e.g., FIG. 6 below). If the pending delete flag is set, method 300 sets a flag for this packet that indicates that the P-old ports as ineligible for transmission of this packet. In one embodiment, method 300 will broadcast this packet out the P-new ports and not the P-old ports. Execution proceeds to block 416, where method 300 processes packets using 802.1D packet processing as described in section 7.7 of that standard using the available ports (e.g., P-new).

If the pending delete flag is not set for this packet at block 412, execution proceeds to block 416, where method 300 processes packets using 802.1D packet processing as described in section 7.7 of that standard using the available ports (e.g. P-new and P-old).

Figure 5:
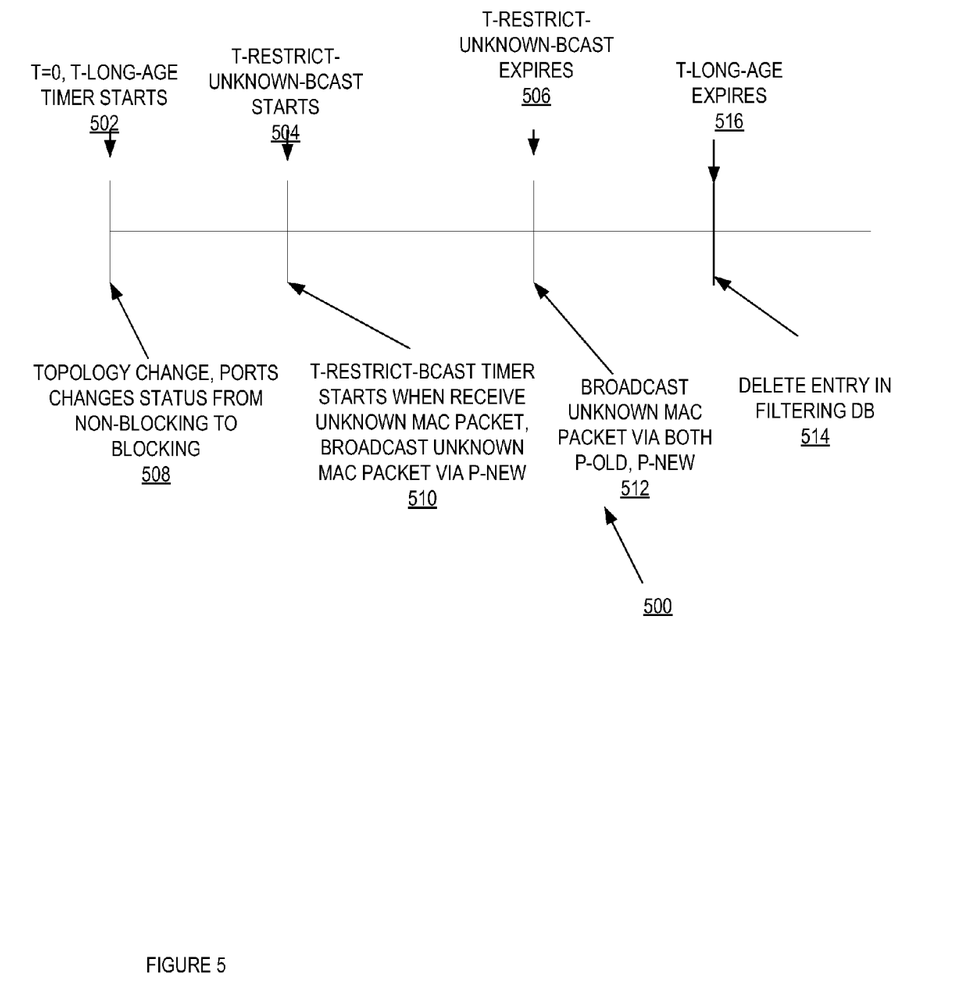
FIG. 5 illustrates timers that are used to control which sets of ports a unicast packet with unknown MAC addresses are broadcast according to one embodiment of the invention.

FIG. 5 illustrates timers that are used to control which sets of ports a unicast packets with unknown destination MAC addresses are broadcast according to one embodiment of the invention. In FIG. 5, at time T=0 (502), a topology change occurs that changes the status of a P-new port from non-blocking to blocking (508). In one embodiment, the topology change is detected using a protocol that actively checks for bridging loops, such as spanning tree protocol. In one embodiment, in response to the topology change, the timer T-long-age is started (502) for some or all MAC addresses learnt on this port.

When a packet with an unknown MAC address is received on one of the P-new ports, the T-restrict-unknown-bcast timer is started for this packet (504). In one embodiment, between time when this timer is started (504) and the time this timer expires (506), a unicast packet with an unknown MAC address that has a destination MAC that matches the entry associated with this timer is broadcast out the P-new ports (510). After the T-restrict-unknown-bcast timer has expired (506), in one embodiment, retransmitted unicast packets with the corresponding destination MAC address are broadcast out the P-old ports (512). In this embodiment, the T-restrict-unknown-bcast represents a criteria as to whether this unicast packet is broadcast out the P-new ports, the P-old ports, or both. In an alternate embodiment, retransmitted unicast packets with the corresponding destination MAC address are broadcast out the P-old ports (512). In one embodiment and in response to timer T-long-age expiring for this destination MAC address (516), the corresponding entry in filtering database is deleted (514).

Figure 6:
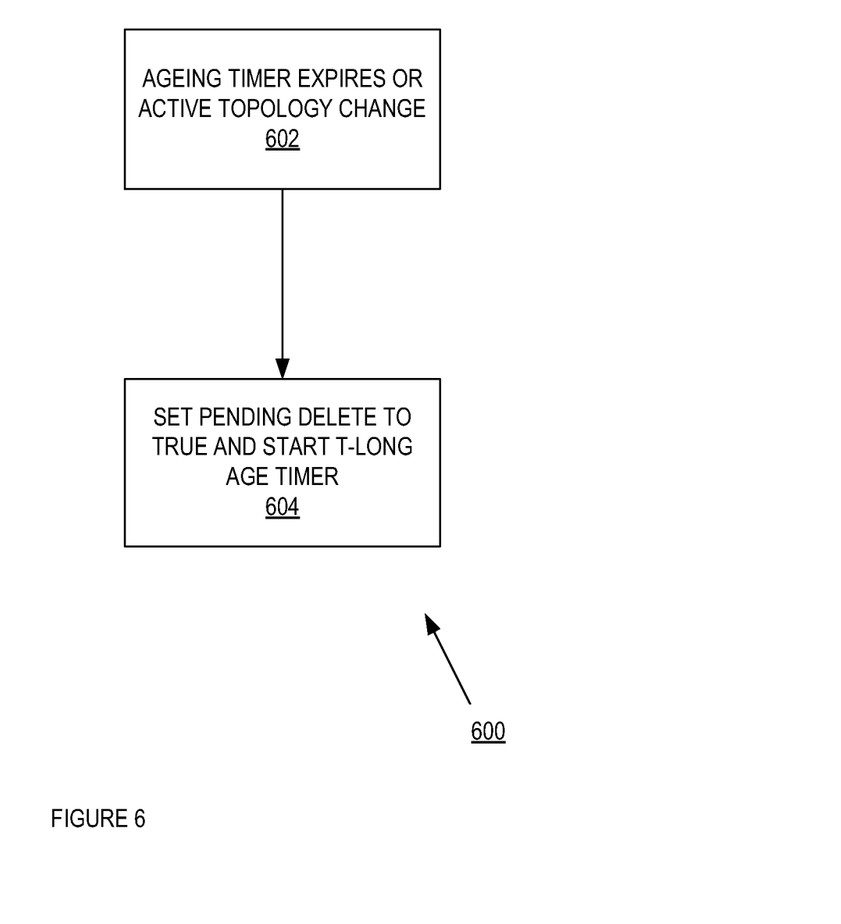
FIG. 6 is an exemplary flow diagram of the timer T-restrict-unknown-bcast expiring according to one embodiment of the invention.

FIG. 6 is an exemplary flow diagram of method 600 for the actions of timer T-long-age according to one embodiment of the invention. In FIG. 6, at block 602, method 600 detects that an ageing timer expires or an active topology change. In one embodiment, the ageing timer that expires corresponds to a MAC address of a unicast packet. In another embodiment, the active topology change is detected using a protocol that detects such topology changes. For example, and in one embodiment, an active topology change protocol is spanning tree protocol.

At block 604, method 600 sets the pending-delete flag and starts the T-long-age timer. In one embodiment and in response to an ageing timer expiring for a particular MAC address, method 600 sets the pending-delete and starts the T-long-age timer for an entry in the filtering database for an entry that corresponds to that particular MAC address. In another embodiment and in response to an active topology change, method 600 sets the pending-delete flag and starts the T-long-age timer for all MAC addresses learnt on the P-new port that had its status change to blocking.

Figure 7:
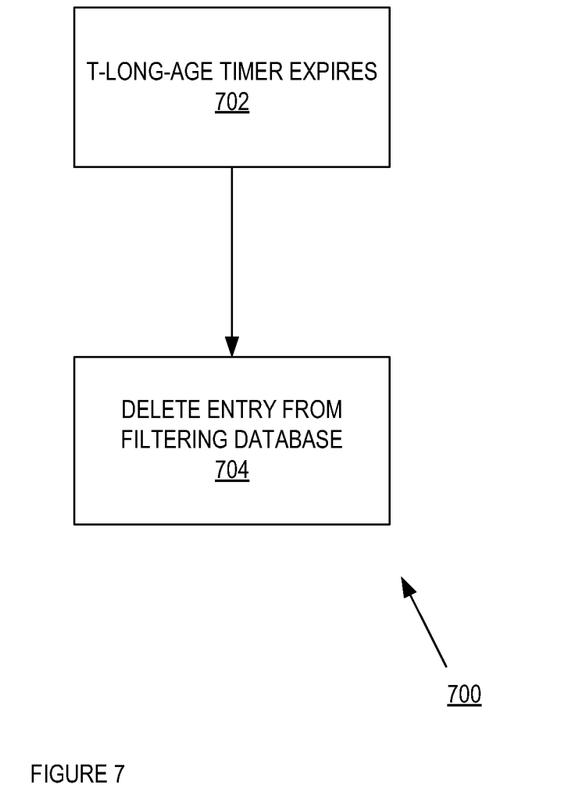
FIG. 7 is an exemplary flow diagram of the timer T-long-age expiring according to one embodiment of the invention.

FIG. 7 is an exemplary flow diagram of method 700 of the timer T-long-age expiring according to one embodiment of the invention. In FIG. 7, at block 702, method 700 detects that timer T-long-age expires. At block 704, method 700 deletes a corresponding entry from the filtering database.

Figure 8:
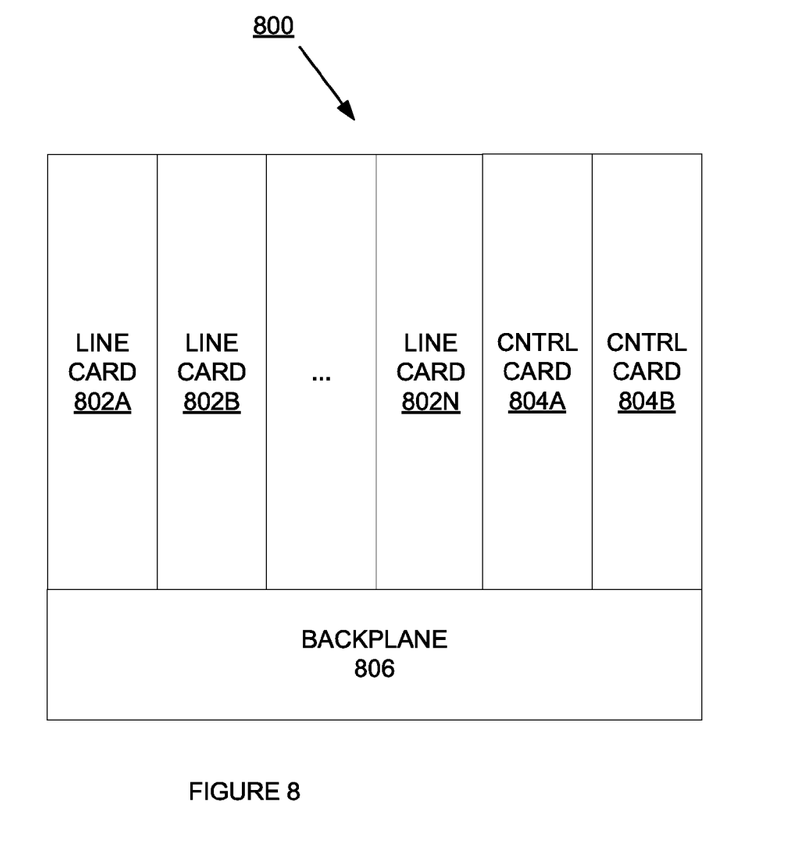
FIG. 8 is a block diagram illustrating an exemplary hybrid network element that that allows for the transition of the provider network from bridging protocols used in FIG. 2 and VPLS and/or PBB according to one embodiment of the system.

FIG. 8 is a block diagram illustrating an exemplary hybrid network element 800 that transitions the provider network from bridging protocols used in FIG. 2 and VPLS and/or PBB according to one embodiment of the system. In FIG. 8, backplane 806 couples to line cards 802A-N and controller cards 804A-B. While in one embodiment, controller cards 804A-B control the processing of the traffic by line cards 802A-N, in alternate embodiments, controller cards 804A-B perform the same and/or different functions (selective broadcasting of address resolution packets and/or unicast packet with unknown MAC addresses, tracking address resolution request packets, etc.). Line cards 802A-N process and forward traffic according to the policies received from controller cards 804A-B. In one embodiment, line cards 802A-N switch unicast and ARP packets as described in FIGS. 2-8. It should be understood that the architecture of the network element 800 illustrated in FIG. 8 is exemplary, and different combinations of cards may be used in other embodiments of the invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. For example, and in one embodiment, packets with unknown MAC addresses are not restricted to IP packets and can be other types of packet known in the art (Ethernet, ATM, etc.). The description is thus to be regarded as illustrative instead of limiting.

The invention claimed is:

1. A method in a hybrid node operating first and second bridging protocols for an incremental transitioning of nodes in a network from the first bridging protocol to the second bridging protocol, wherein said nodes are coupled to end stations, wherein the first bridging protocol shares Media Access Control (MAC) addresses of end stations amongst all nodes in the network and end stations directly coupled to each other with the first bridging protocol, the method comprising the steps of:
operating the first bridging protocol on a first set of one or more of a plurality of ports of the hybrid node, wherein the first set of ports are coupled to one or more nodes operating the first bridging protocol and not the second bridging protocol;
operating the second bridging protocol on a second set of one or more of the plurality of ports of the hybrid node;
responsive to receiving a first unicast packet on one of the first set of ports that includes a destination MAC address that is unknown to the hybrid node, broadcasting the first unicast packet out the second set of ports;
responsive to receiving a second unicast packet on one of the second set of ports that includes a destination MAC address that is unknown to the hybrid node, broadcasting the second unicast packet out those of the second set of ports on which the second unicast packet was not received and not broadcasting the second unicast packet out the first set of ports; and
responsive to receiving a third unicast packet on one of the second set of ports that includes a destination MAC address that is unknown to the hybrid node and is a same destination MAC address as included in the second unicast packet, broadcasting the third unicast packet out the first set of ports.

2. The method of claim 1,
wherein further responsive to receiving the second unicast packet, starting a timer for the destination MAC address included in the second unicast packet; and
wherein the third unicast packet is received after the timer for the destination MAC address expiring.

3. The method of claim 1, wherein the third unicast packet is received at a time by which its destination MAC address would have been learned as a result of broadcasting the second unicast packet if the corresponding end station was coupled to one of the second set of ports.

4. The method of claim 1, wherein the first bridging protocol is 802.1Q bridging, and the second bridging protocol is one of Virtual Private Local Area Network Service (VPLS) and Provider Bridge Backbone (PBB).

5. The method of claim 1, further comprising the steps:
receiving a fourth unicast packet on one of the second set of ports, the fourth unicast packet including a destination MAC address that is known to the hybrid node;
accessing a filtering database that stores expirations of known MAC addresses to determine whether the destination MAC address of the fourth unicast packet is expired;
responsive to determining that the destination MAC address of the fourth unicast packet is expired, broadcasting the fourth unicast packet out those of the second set of ports on which the fourth unicast packet was not received.

6. The method of claim 5, wherein expirations of known MAC addresses are based on an ageing time period of the first bridging protocol.

7. The method of claim 5, wherein expirations of known MAC addresses are based on a known MAC address being learnt on one of the second set of ports whose status has changed from non-blocking to blocking in response to a detected active topology change in the network.

8. An apparatus, comprising:
a hybrid node that is configured to operate a first bridging protocol and a second bridging protocol in a network, wherein the first bridging protocol shares Media Access Control (MAC) addresses of end stations amongst all nodes in the network, the hybrid node comprising:
a first set of one or more ports that are to be coupled with a set of one or more nodes that operate the first bridging protocol and not the second bridging protocol;
a second set of two or more ports that are to be coupled with a set of two or more nodes that operate the second bridging protocol; and
a MAC relay component to perform the following:
cause first unicast packets received on the first set of ports to be broadcast out the second set of ports, wherein the first unicast packets each include a destination MAC address that is unknown to the hybrid node,
cause second unicast packets received on one of the second set of ports to be broadcast out those of the second set of ports on which the second unicast packets were not received, wherein the second unicast packets each include a destination MAC address that is unknown to the hybrid node,
inhibit the second unicast packets from being broadcast out the first set of ports,
cause third unicast packets received on the second set of ports to be broadcast out the first set of ports, wherein the third unicast packets each include a destination MAC address that is unknown to the hybrid node and is the same destination MAC address as one of the second unicast packets, and wherein the third unicast packets are each received after the second unicast packets are received.

9. The apparatus of claim 8, wherein the MAC relay component is further to perform the following:
in response to receipt of each of the second unicast packets, starting a timer for the destination MAC address included in that second unicast packet; and
wherein each of the third unicast packets is received after the timer for the destination MAC address in that unicast packet has expired.

10. The apparatus of claim 8, wherein each of the third unicast packets is received at a time by which its destination MAC address would have been learned as a result of broadcasting the second unicast packet having the same destination MAC address if an end station corresponding to that destination MAC address was coupled to one of the second set of ports.

11. The apparatus of claim 8, wherein the first bridging protocol is 802.1Q bridging, and the second bridging protocol is one of Virtual Private Local Area Network Service (VPLS) and Provider Bridge Backbone (PBB).

12. The apparatus of claim 8, wherein the hybrid node further comprises:
a filtering database to store expirations of known MAC addresses; and
wherein the MAC relay component is further to perform the following:
detect for which of known destination MAC addresses contained in fourth unicast packets received on the second set of ports are expired according to the filtering database, and
cause those of the fourth unicast packets containing the expired known destination MAC addresses to be broadcasted out those of the second set of ports that did not receive those of the fourth unicast packets.

13. The apparatus of claim 12, wherein expirations of known MAC addresses are based on an ageing time period of the first bridging protocol.

14. The apparatus of claim 12, wherein expirations of known MAC addresses are based on a known MAC address being learnt on one of the second set of ports whose status has changed from non-blocking to blocking in response to a detected active topology change in the network.

15. An apparatus, comprising:
a first bridging sub-network that includes a plurality of nodes, wherein each of the nodes in the first bridging sub-network communicates packets within the first bridging sub-network according to a first bridging protocol and not a second bridging protocol, wherein the nodes in the first bridging sub-network are coupled to end stations, wherein the first bridging protocol shares Media Access Control (MAC) addresses of the end stations amongst all nodes and end stations directly coupled to each other with the first bridging protocol;
a second bridging sub-network that includes a plurality of nodes, wherein each of the nodes in the second bridging sub-network communicate packets within the second bridging sub-network according to the second bridging protocol, and wherein the nodes in the second bridging sub-network include nodes to which end stations are coupled; and
a hybrid node coupled to the first and second bridging sub-networks to communicate packets between those bridging sub-networks, wherein the hybrid node operates the first and second bridging protocols, the hybrid node comprising:
a first set of one or more ports coupled to a first set of one or more nodes in the first bridging sub-network,
a first bridge instance, coupled to the first set of ports, that operates the first bridging protocol,
a second set of two or more ports coupled to a second set of two or more nodes in the second bridging sub-network,
a second bridge instance, coupled to the second set of ports, that operates the second bridging protocol, and
a MAC relay component, coupled to the first and second bridging instances, to limit the number of MAC addresses that the first set of nodes store in their MAC address table, wherein the MAC relay component is to perform the following:
relay first unicast packets received on one of the first set of ports to the second bridge instance which is configured to broadcast them out the second set of ports, wherein the first unicast packets each contain a destination MAC address that is unknown to the hybrid node,
inhibit relaying to the first bridge instance second unicast packets received on the second set of ports, wherein the second unicast packets contain destination MAC addresses that are unknown to the hybrid node and each of the second unicast packets are broadcast out those of the second set of ports that did not receive that packet, and
relay third unicast packets received on the second set of ports to the first bridge instance to be broadcast out the first set of ports, wherein the third unicast packets each include a destination MAC address that is unknown to the hybrid node and is the same destination MAC address as one of the second unicast packets, and wherein the third unicast packets are each received after the second unicast packets are received.

16. The apparatus of claim 15, wherein the MAC relay component is further to perform the following:
in response to receipt of each of the second unicast packets, starting a timer for the destination MAC address included in that second unicast packet; and
wherein each of the third unicast packets is received after the timer for the destination MAC address in that unicast packet has expired.

17. The apparatus of claim 15, wherein each of the third unicast packets is received at a time by which its destination MAC address would have been learned as a result of broadcasting the second unicast packet having the same destination MAC address if an end station corresponding to that destination MAC address was coupled to one of the second set of ports.

18. The apparatus of claim 15, wherein the hybrid node further comprises:
a filtering database to store expirations of known MAC addresses; and
wherein the MAC relay component is further to perform the following:
detect for which of known destination MAC addresses contained in fourth unicast packets received on the second set of ports are expired according to the filtering database, and
cause those of the fourth unicast packets containing the expired known destination MAC addresses to be broadcasted out those of the second set of ports that did not receive those of the fourth unicast packets.

19. The apparatus of claim 18, wherein expirations of known MAC addresses are based on an ageing time period of the first bridging protocol.

20. The apparatus of claim 18, wherein expirations of known MAC addresses are based on a known MAC address being learnt on one of the second set of ports whose status has changed from non-blocking to blocking in response to a detected active topology change in the network.

* * * * *